United States Patent [19]
Fukao et al.

[11] Patent Number: 5,703,423
[45] Date of Patent: Dec. 30, 1997

[54] ENERGY STORAGE FLYWHEEL SYSTEM

[75] Inventors: Tadashi Fukao, 24-45 Matsukazedai, Aoba-ku, Yokohama-shi, Kanagawa-ken 227; Akira Chiba, 1-8-14-707 Shimo Ochiai, Shinjuku-ku, Tokyo 161; Chikara Michioka, 2-8-21-909 Hatanodai, Shinagawa-ku, Tokyo 142, all of Japan

[73] Assignees: Tadashi Fukao, Yokohama; Akira Chiba; Chikara Michioka, both of Tokyo; Seiko Seiki Co., Inc., Narashino; Nikkiso Co., Ltd.; Ebara Corporation, both of Tokyo, all of Japan

[21] Appl. No.: 621,589

[22] Filed: Mar. 26, 1996

[30] Foreign Application Priority Data

Mar. 29, 1995 [JP] Japan .................. 7-096235

[51] Int. Cl.$^6$ .............................. H02K 7/02; H02K 7/09
[52] U.S. Cl. .............................. 310/90.5; 310/74; 310/114
[58] Field of Search .............................. 310/74, 90.5, 114

[56] References Cited

U.S. PATENT DOCUMENTS

| | | | |
|---|---|---|---|
| 3,988,658 | 10/1976 | Meinke et al. | 310/12 |
| 4,683,391 | 7/1987 | Higuchi | 310/90.5 |
| 4,723,735 | 2/1988 | Eisenhaure et al. | 244/165 |
| 4,792,710 | 12/1988 | Williamson | 310/90.5 |
| 4,839,550 | 6/1989 | Mizuno et al. | 310/90.5 |
| 4,841,204 | 6/1989 | Studer | 310/90.5 |
| 4,947,067 | 8/1990 | Habermann et al. | 310/51 |
| 5,398,571 | 3/1995 | Lewis | 74/572 |
| 5,424,595 | 6/1995 | Preston et al. | 310/90.5 |
| 5,504,382 | 4/1996 | Douglass et al. | 310/156 |

FOREIGN PATENT DOCUMENTS

| | | |
|---|---|---|
| WO 92/12566 | 7/1992 | WIPO. |
| WO 95/02270 | 1/1995 | WIPO. |

OTHER PUBLICATIONS

"Transportation", *Technology 1994*, IEEE Spectrum, Jan. 1994, pp. 62–63.

"Design Considerations for Magnetically Suspended Flywheel Systems", Anand et al., University of Maryland, Proceedings of the 20th Inter Society Energy Conversion Engineering Conference 1985, pp. 2.449–2.453.

"Sensorless Control of the Flywheel Drive Machine for UPS", Okazaki et al., Proceedings of the 6th Annual Conference of Industry Application Society, 1993, the Institute of Electrical Engineers of Japan, pp. 500–503.

"Analysis of No–Load Characteristics of a Bearingless Induction Motor"; Akira Chiba et al.; 8095 IEEE Transactions on Industry, vol. 31, No. 1; Jan./Feb./1995.

Japanese Abstract—"Converter Using a Flywheel"; 57-177444(A); Nov. 1, 1982.

"An Analysis of Bearingless AC Motors", Chiba et al., IEEE Transactions on Energy Conversion, vol. 9, No. 1, Mar. 1994, pp. 61–68.

"Principles and No Load Characteristics of Bearingless Motors with a Cylindrical Rotor", Chiba et al., T. IEE Japan, vol. 113–D, No. 4, 1993, pp. 539–547.

"Uninterruptible Power System with a High Speed Flywheel", Masayuki et al., IEEE, Proc. Intersociety Energy Conversion Engineering Conf. 1985 [2], pp. 2560–2565.

Primary Examiner—Clayton E. LaBalle
Attorney, Agent, or Firm—Armstrong, Westerman, Hattori, McLeland, & Naughton

[57] ABSTRACT

A flywheel for storing inertial energy is integral with a rotor which is rotatable around a stator. The stator has main windings that provide a number of poles for rotating the rotor and auxiliary control windings that provide a number of poles different from the number of poles provided by the main windings. When currents are supplied to the main windings, the rotor and hence the flywheel are rotated. When control currents are supplied to the auxiliary control windings, radial forces acting on the rotors are generated thereby to support the rotor out of contact with the stator.

8 Claims, 7 Drawing Sheets

ENERGY STORAGE FLYWHEEL SYSTEM

BACKGROUND OF THE INVENTION

1. Field of the Invention

The present invention relates to an energy storage flywheel system which can be rotated at ultra-high speeds, suffers a minimum of energy loss, and is of a compact structure.

2. Description of the Related Art

Energy storage flywheel systems are widely used in no-break power units for nuclear fusion apparatus, nuclear power reactors, power supply stations for railway trains, and mobile objects such as automobiles, spaceships, etc. One simple way of reducing the size and weight of energy storage flywheel systems is to increase the rotational speed of the rotor up to a very high rotational speed. The energy storage flywheel systems which have flywheels rotatable at ultra-high speeds incorporate magnetic bearings for supporting the flywheels in order to eliminate the problems of speed limits and frequent maintenance which would otherwise be caused by mechanical bearings.

The magnetic bearings in the energy storage flywheel systems tend to be large in size for generating sufficient forces to hold the flywheel shaft. Actually, some magnetic bearings have a size equal to the shaft length of the rotatable assembly of energy storage flywheel systems. Therefore, the main shafts of energy storage flywheel systems are so long that they are subject to elastic vibrations upon high-speed rotation, and cannot be rotated at very high speeds. For increasing the output power of energy storage flywheel systems, it is necessary to increase the axial length of a stator and a rotor of the rotatable assembly. To meet such a requirement, the size of magnetic bearings used has to be increased because attractive forces generated between the stator and the rotor upon rotation thereof are increased. As a result, the critical speed of the energy storage flywheel systems is lowered, and hence the energy storage flywheel systems cannot be rotated at higher speeds.

FIG. 1 of the accompanying drawings illustrates an actuating system which comprises magnetic bearings with windings for controlling the radial position of rotors, which has been proposed by the inventors of the present application. As shown in FIG. 1, the actuating system has two units 16 each connected to a three-phase inverter 17 for controlling currents supplied to windings 20 for controlling the radial position of rotors, and also to a three-phase inverter 18 for generating a motor torque. Each of the units 16 has four-pole main windings for generating a motor torque and two-pole auxiliary windings for generating radial forces on the rotor.

Details of the actuating system shown in FIG. 1 are disclosed in "Principles of generation of radial forces when a bearing-less motor with a cylindrical rotor operates under no load" by Akira Chiba, Kouichi Ikeda, Fukuzo Nakamura, Tazumi Deido, Tadashi Fukao, and M. A. Rahman, IEEJ (Institute of Electrical Engineers of Japan) Transaction D. Vol. 113, No. 4, pp. 539–547, 1993, for example. Since each of the units 16 is capable of generating a motor torque and radial forces, the actuating system has a shorter shaft than general ultra-high-speed motors with magnetic bearings, and can produce a higher output power if its shaft length is the same as those of the general ultra-high-speed motors with magnetic bearings.

The actuating system proposed by the inventors of the present application has the following features:

(1) The actuating system, if it has three-phase windings, requires only six wire cables and two three-phase inverters for generating radial forces along two orthogonal axes and a motor torque.

(2) Because the windings for generating the radial forces and the windings for generating the motor torque are separate from each other, the inverter or power amplifier for controlling the radial forces may be of a relatively small power requirement.

(3) Inasmuch as the actuating system employs the four-pole windings and the two-pole windings, if the rotors are positioned centrally within the stators, there is no mutual coupling, and no induced voltage is developed in the windings for controlling radial forces.

(4) The actuating system can be used in a wide variety of high-output-power rotary machines which assume a sine-wave distribution of electromotive forces and a sine-wave distribution of magnetic fluxes, including an induction machine, a permanent-magnet synchronous machine, a synchronous reluctance motor, etc.

FIG. 2 of the accompanying drawings illustrates the principles of generation of forces acting radially on a rotor in the actuating system. As shown in FIG. 2, a stator has four-pole windings $N_4$ for producing four-pole magnetic fluxes $\psi_4$ and two-pole windings $N_2$ for producing two-pole magnetic fluxes $\psi_2$. The four-pole windings $N_4$ of the stator serve to generate a motor torque on the rotor. If the rotor is positioned centrally in the stator, then when a current flows through the four-pole windings $N_4$ in a positive direction, the four-pole windings $N_4$ generate four-pole symmetric magnetic fluxes $\psi_4$.

When a two-phase alternating current is supplied to the four-pole windings $N_4$ and four-pole windings perpendicular thereto, a four-pole revolving magnetic field is generated. The stator may alternatively have three-phase windings. If the rotor has a squirrel-cage winding, then it generates a torque due to the revolving magnetic field, with the assembly operating as an ordinary squirrel-cage induction machine. If the rotor has four-pole permanent magnets, then it generates a torque due to the revolving magnetic field, with the assembly operating as an ordinary permanent-magnet motor.

The two-pole windings $N_2$ of the stator serve to produce forces acting radially on the rotor. When a current flows through the two-pole windings $N_2$ in a positive direction, they generate two-pole magnetic fluxes $\psi_2$ as shown in FIG. 2. Across a gap below the rotor as shown in FIG. 2, the four-pole magnetic fluxes $\psi_4$ and the two-pole magnetic fluxes $\psi_2$ flow in opposite directions. Therefore, the flux density is relatively low across the gap below the rotor. Across a gap above the rotor as shown in FIG. 2, the four-pole magnetic fluxes $\psi_4$ and the two-pole magnetic fluxes $\psi_2$ flow in the same direction. Consequently, the flux density is relatively high across the gap above the rotor.

When the magnetic fluxes are brought out of equilibrium as shown, the rotor is subjected to radial forces F which are directed upwardly in FIG. 2. The magnitude of the radial forces F can be adjusted by controlling the magnitude of the current flowing through the two-pole windings $N_2$. To reverse the direction of the radial forces F, the direction of the current flowing through the two-pole windings $N_2$ may be reversed.

In order to generate radial forces horizontally across the rotor in FIG. 2, two-pole windings may be provided on the stator which are directed perpendicularly to the two-pole windings $N_2$, and a current flowing through the two-pole windings may be adjusted in magnitude and direction. By thus adjusting the magnitude and direction of the currents flowing through these two-pole windings, it is possible to generate radial forces of desired magnitudes and directions.

In FIG. 2, the four-pole windings $N_4$ are used to rotate the rotor and the two-pole windings $N_2$ are used to control the radial position of the rotor. However, it is possible to use the four-pole windings $N_4$ to control the radial position of the rotor and the two-pole windings $N_2$ to rotate the rotor.

The energy storage flywheel systems are required to meet the following demands:

(1) The main shaft of the energy storage flywheel systems should be supported stably with a minimum of energy loss when they operate in an ultra-high speed range.

(2) The energy storage flywheel systems should be of as compact a structure as possible to avoid the problem of a critical speed upon ultra-high speed rotation.

(3) A power supply arrangement for producing electromagnetic forces to support the main shaft of the energy storage flywheel systems should be as simple as possible.

(4) The energy storage flywheel systems should have bearings and rotatable assemblies that can withstand ultra-high speed rotation.

SUMMARY OF THE INVENTION

It is therefore an object of the present invention to provide an energy storage flywheel system which is capable of ultra-high speed rotation, suffers a reduced energy loss, and has a compact structure.

According to the present invention, there is provided an energy storage flywheel system comprising a stator, a rotor rotatable with respect to the stator, the rotor being integrally formed with a flywheel for storing energy, the stator having a first set of windings that provide a number of poles for rotating the rotor and a second set of windings that provide a number of poles different from the number of poles provided by the first set of windings, power supply means for supplying currents to the first set of windings to rotate the rotor, and control means for supplying control currents to the second set of windings to produce radial forces acting on the rotor to support the rotor out of contact with the stator.

The control means may comprise means for supplying the control currents to the second set of windings to produce radial forces acting on the rotor to effect active damping on the flywheels or eliminate disturbances on the flywheel.

The flywheel may be disposed around the rotor, the rotor being integral with the flywheel and disposed around the stator, further comprising a pair of axially spaced actuators each having the stator and disposed in the rotor, the first set of windings comprising main windings mounted on each of the actuators, the second set of windings comprising auxiliary control windings mounted on each of the actuators. The main windings may have coil ends positioned only on outer axial ends of the actuators and extend through inner confronting axial ends of the actuators. The power supply means may comprise a single power converter and a pair of power converters, the main windings being connected to the power converter, and the auxiliary control windings being connected respectively to the pair of power converters.

According to the present invention, there is also provided an energy storage flywheel system comprising a pair of sets of stators, a pair of axially adjacent rotors rotatable respectively with respect to the pair of sets of stators, the rotors being combined with respective flywheels for storing energy, each of the stators having main windings that provide a number of poles for rotating the rotor and auxiliary control windings that provide a number of poles different from the number of poles provided by the main windings, the main windings of the stators comprising three-phase windings connected in different phase sequences, a single power converter for supplying currents to the main windings to rotate the rotors in opposite directions for thereby canceling out gyro moment vectors produced on the flywheels, and four power converters for supplying control currents to the auxiliary control windings to produce radial forces acting on the rotors to support the rotors out of contact with the stators.

According to the present invention, there is further provided an energy storage flywheel system comprising a pair of sets of stators, a pair of axially adjacent rotors rotatable respectively with respect to the pair of sets of stators, the rotors being combined with respective flywheels for storing energy, each of the stators having main windings that provide a number of poles for rotating the rotor and auxiliary control windings that provide a number of poles different from the number of poles provided by the main windings, a power converter for supplying currents to the main windings to rotate the rotors in opposite directions for thereby canceling out gyro moment vectors produced on the flywheels, and four power converters for supplying control currents to the auxiliary control windings to produce radial forces acting on the rotors to support the rotors out of contact with the stators.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
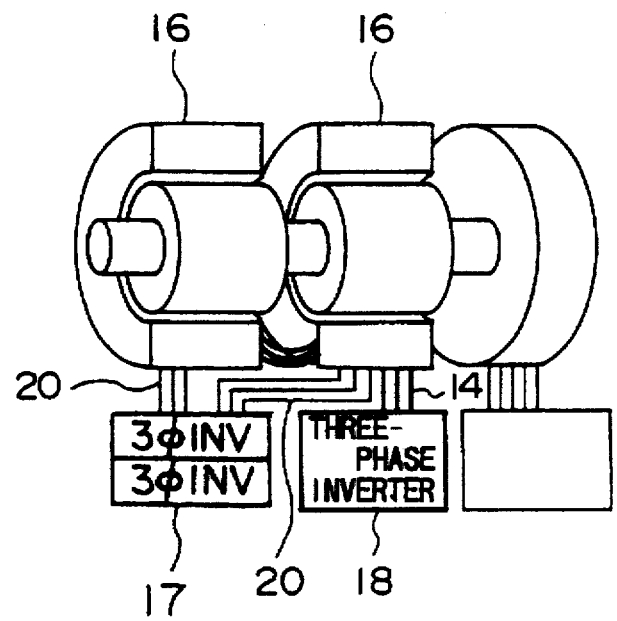
FIG. 1 is a schematic view of a conventional actuating system which comprises magnetic bearings with windings for controlling the radial position of rotors.
Figure 2:
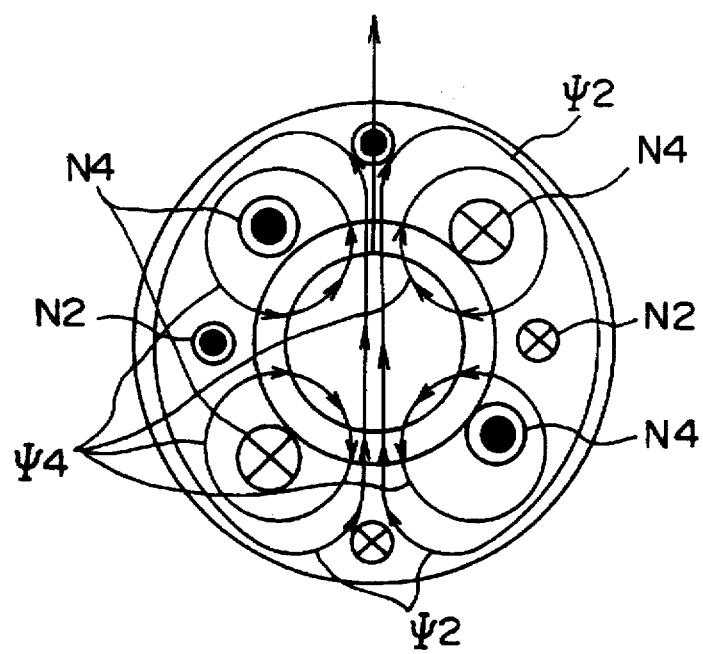
FIG. 2 is a diagram illustrative of the principles of generation of radial forces in the actuating system shown in FIG. 1.
Figure 3:
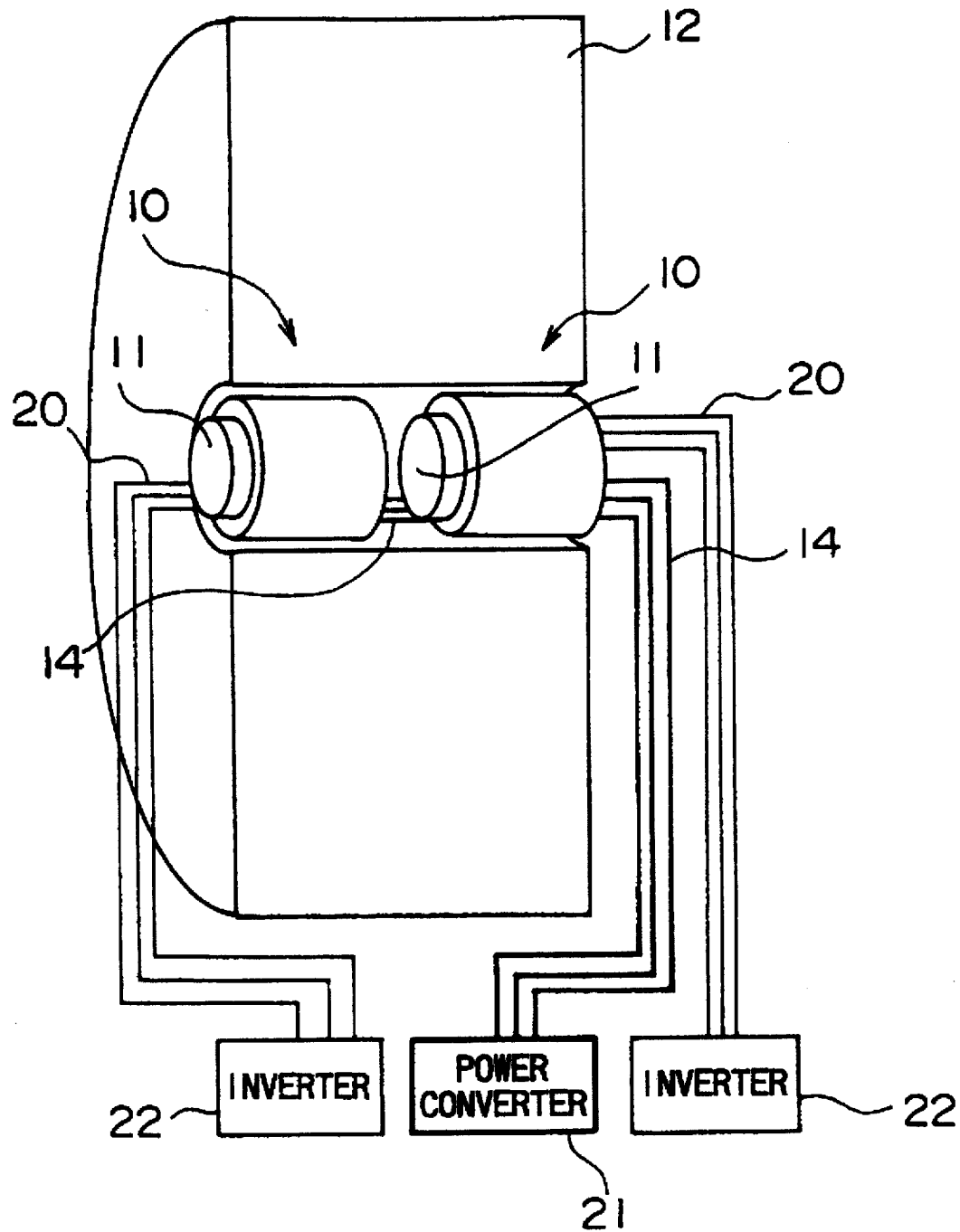
FIG. 3 is a schematic view, partly in block form, of an energy storage flywheel system according to a first embodiment of the present invention.

As shown in FIG. 3, an energy storage flywheel system according to a first embodiment of the present invention has two axially spaced actuators 10 which comprise respective stators 11 and a flywheel 12 integral with an outer rotor rotatably disposed around the stators 11. The actuators 10 double as respective magnetic bearings by which the flywheel 12 is rotatably supported around the stators 11 out of contact therewith. The flywheel 12 has its axis lying horizontally in alignment with the horizontal axes of the stators 11.

The stators 11, which may comprise induction or synchronous machine stators, have respective stator iron supporting main windings 14 and auxiliary control windings 20 which provide different numbers of poles from those of the main windings 14. When control currents flow through the auxiliary control windings 20, the actuators 10 operate as the magnetic bearings to produce radial forces for supporting the flywheel 12. Each of the stators 11 is capable of generating and controlling radial forces in two radial directions. Therefore, the two stators 11 are capable of generating and controlling radial forces in four radial directions.

While the axes of the flywheel 12 and the stators 11 extend horizontally in the embodiment shown FIG. 3, they may extend vertically.

The main windings 14 of each of the stators 11 may comprise four-pole windings, and the auxiliary control windings 20 thereof may comprise two-pole windings. Alternatively, the main windings 14 of each of the stators 11 may comprise two-pole windings, and the auxiliary control windings 20 thereof may comprise four-pole windings.

The main windings 14 of the actuators 10 are connected in series or parallel to each other. Therefore, the actuators 10 are combined with each other, and are energized by a single power converter 21.

Figure 4:
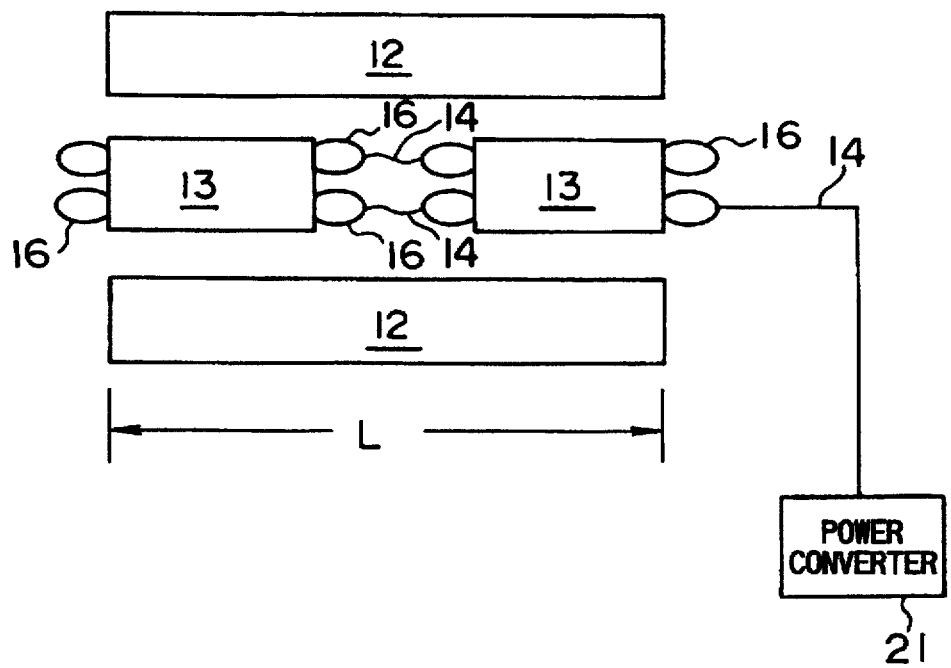
FIGS. 4 and 5 are schematic views of coil end arrangements.

In FIG. 4, the main windings 14 of the respective actuators 10 have coil ends 16 disposed on each of the opposite ends of the stator iron 13. The energy storage flywheel system with such a coil end arrangement shown in FIG. 4 has an axial length L.

Figure 5:
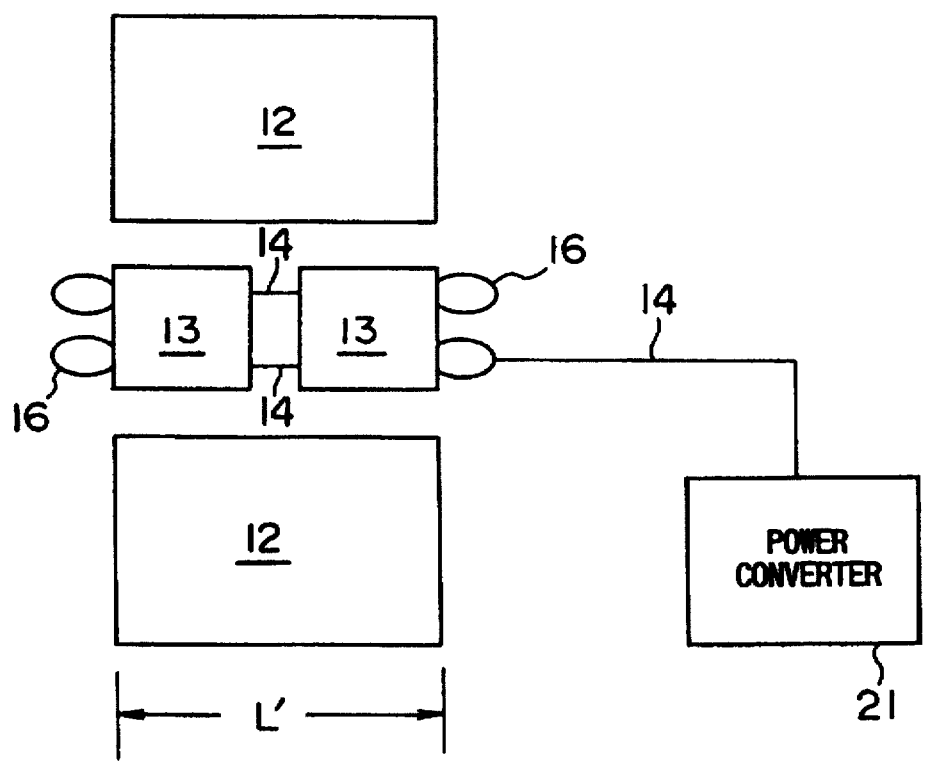

In FIG. 5, the main windings 14 of the respective actuators 10 have coil ends 16 disposed on only outer ends of the stator iron 13, and are connected directly between confronting inner ends of the stator iron 13. The energy storage flywheel system with such a coil end arrangement shown in FIG. 5 has an axial length L' smaller than the axial length L shown in FIG. 4. Since the windings 14 can be made longer by the dimension of the space which would otherwise be needed to accommodate the coil ends 16 between the stator iron 13 as shown in FIG. 4, the energy storage flywheel system shown in FIG. 5 can generate a higher output power than the energy storage flywheel system shown in FIG. 4. While the coil ends of the auxiliary control windings cannot be dispensed with, they are smaller than the coil ends 16 of the main windings 14.

The control windings 20, which are provided on the respective actuators 10, are connected to respective inverters 22 for supplying control currents to control the radial position of the flywheel 12 with respect to the stators 11. The inverters 22 comprise respective semiconductor power converters which are controlled by a controller (not shown) to support the flywheel 12 stably under magnetic forces around the stators 11.

The controller controls the inverters 22 as follows: The radial position of the flywheel 12 is detected by a radial displacement sensor, and a radial position signal from the radial displacement sensor is amplified by a sensor amplifier. The amplified signal from the sensor amplifier is adjusted in phase and gain by a compensating circuit, and the adjusted signal is amplified by a power amplifier and supplied as control currents from the inverters 22 to the control windings 20. When supplied with the control currents, the control windings 20 generate radial magnetic forces on the flywheel 12 to keep the flywheel 12 in a desired target position around the stators 11 while the flywheel 12 is in operation.

Therefore, even when the flywheel 12 is out of equilibrium, the flywheel 12 can be corrected into a state of balance for stable rotation about its own axis, i.e., around the stators 11.

The controller may have a notch filter corresponding to the natural frequency of the flywheel 12 and a phase advancer for effecting a damping control process to attenuate vibrations of the flywheel 12 due to resonance thereof.

The above control process is carried out based on the radial position signal from the radial displacement sensor which measures a gap between the stators 11 and the flywheel 12. However, the radial position of the flywheel 12 may be controlled without the radial displacement sensor. Specifically, since the inductance of the control windings 20 varies when the flywheel 12 is radially displaced with respect to the stators 11, the current and voltage of the control windings 20 may be detected, and a radial displacement of the flywheel 12 with respect to the stators 11 may be detected indirectly based on the detected current and voltage. Control currents to be supplied to the control windings 20 may be controlled by the radial displacement of the flywheel 12 thus detected, for the control of the radial position of the flywheel 12.

The flywheel 12 may be rotatably supported primarily by mechanical bearings, and electromagnetic forces may be supplementally generated on the flywheel 12 for effecting active damping on the flywheel 12 and eliminating disturbances on the flywheel 12.

The flywheel 12 may be axially supported by cone-type bearings, staggered-type bearings, or magnetic thrust bearings.

The energy storage flywheel system according to the first embodiment shown in FIG. 3 is simpler in structure than the conventional energy storage flywheel systems with magnetic bearings. If the energy storage flywheel system shown in FIG. 3 has an outer profile equal to that of the conventional energy storage flywheel systems with magnetic bearings, then since the actuators 10 may be increased in dimensions, they may extend substantially fully in the axial direction of the energy storage flywheel system for generating a higher output power. The radial gap between the stators 11 and the flywheel 12 has an increased area, the actuators 10 can produce greater radial forces than with the conventional energy storage flywheel systems. If the energy storage flywheel system shown in FIG. 3 has an output power rating equal to that of the conventional energy storage flywheel systems with magnetic bearings, then since no space is necessary to accommodate the mechanical bearings, the energy storage flywheel system shown in FIG. 3 may be reduced in size and weight.

Since the flywheel 12 is supported under magnetic forces out of contact with the stators 11, the energy storage flywheel system can rotate at ultra-high speeds and can stably store energy with a minimum of energy loss.

The magnetic bearings are provided by the actuators 10 themselves which serve to rotate the flywheel 12. Therefore, the energy storage flywheel system is of a compact structure and is reduced in size and weight.

The control windings 20 are smaller for generating larger radial forces than the conventional energy storage flywheel systems with magnetic bearings. Therefore, the energy storage flywheel system according to the present invention needs a simple power supply arrangement and hence suffers a relatively small power loss.

Figure 6:
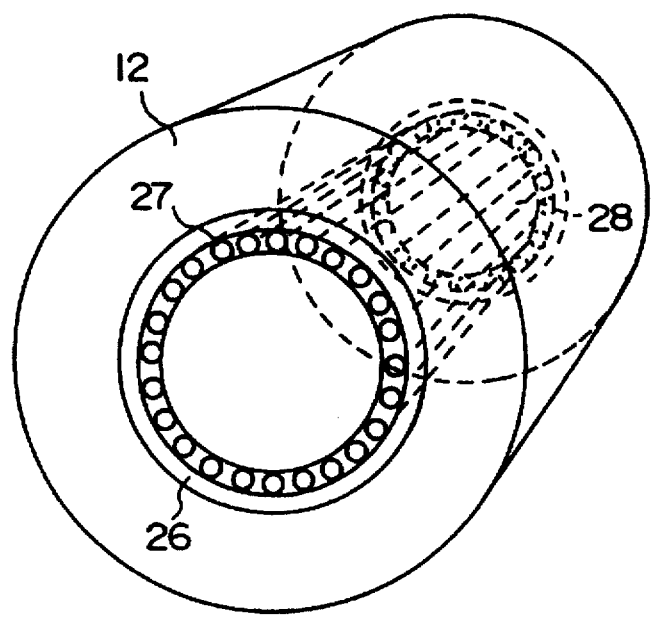
FIG. 6 is a perspective view of an induction-machine rotor for use in the energy storage flywheel system shown in FIG. 3.

FIG. 6 shows an induction-machine outer rotor disposed in the flywheel 12. The flywheel 12 comprises a mechanically strong flywheel, and the induction-machine outer rotor fitted in the flywheel 12 comprises a hollow cylindrical rotor having a cylindrical yoke 26 including slots 27 and a squirrel cage secondary conductor 28 housed in the slots 27. The induction-machine outer rotor shown in FIG. 6 is of a highly simple structure suitable for ultra-high speed rotation. The secondary conductor 28 may not be of a squirrel-cage shape, but may include divided end rings to provide a certain number of poles, e.g., two poles or four poles, for simplifying the control of radial forces generated thereby and lowering a thermal energy loss caused thereby.

Figure 7:
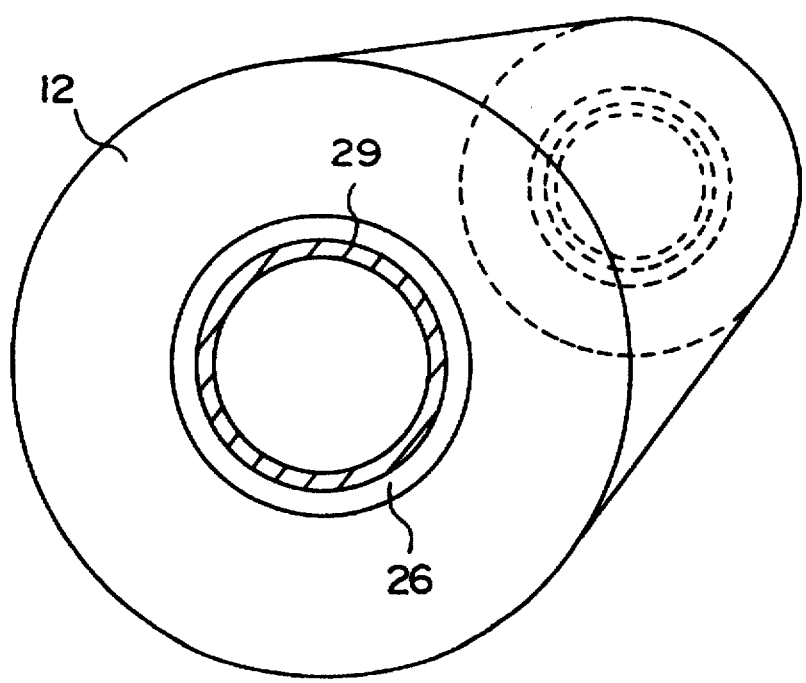
FIG. 7 is a perspective view of a permanent-magnet rotor for use in the energy storage flywheel system shown in FIG. 3.

FIG. 7 shows a permanent-magnet outer rotor disposed in the flywheel 12. The flywheel 12 comprises a mechanically strong metallic flywheel, and the permanent-magnet outer rotor fitted in the flywheel 12 comprises a hollow cylindrical rotor having a cylindrical yoke 26 and a cylindrical permanent magnet 29 fitted in the cylindrical yoke 26.

Rather than the induction-machine type outer rotor or the permanent-magnet outer rotor, there may be employed various actuators doubling as magnetic bearings, including a reluctance-type actuator, a hysteresis-type actuator, a homopolar-type actuator, a comb-type actuator, and a Landell-type actuator. Therefore an outer rotor type energy storage flywheel system is realized by combining an outer rotor having a flywheel thereon and a cylindrical stator having two poles windings and four poles windings as main windings and auxiliary windings.

Figure 8:
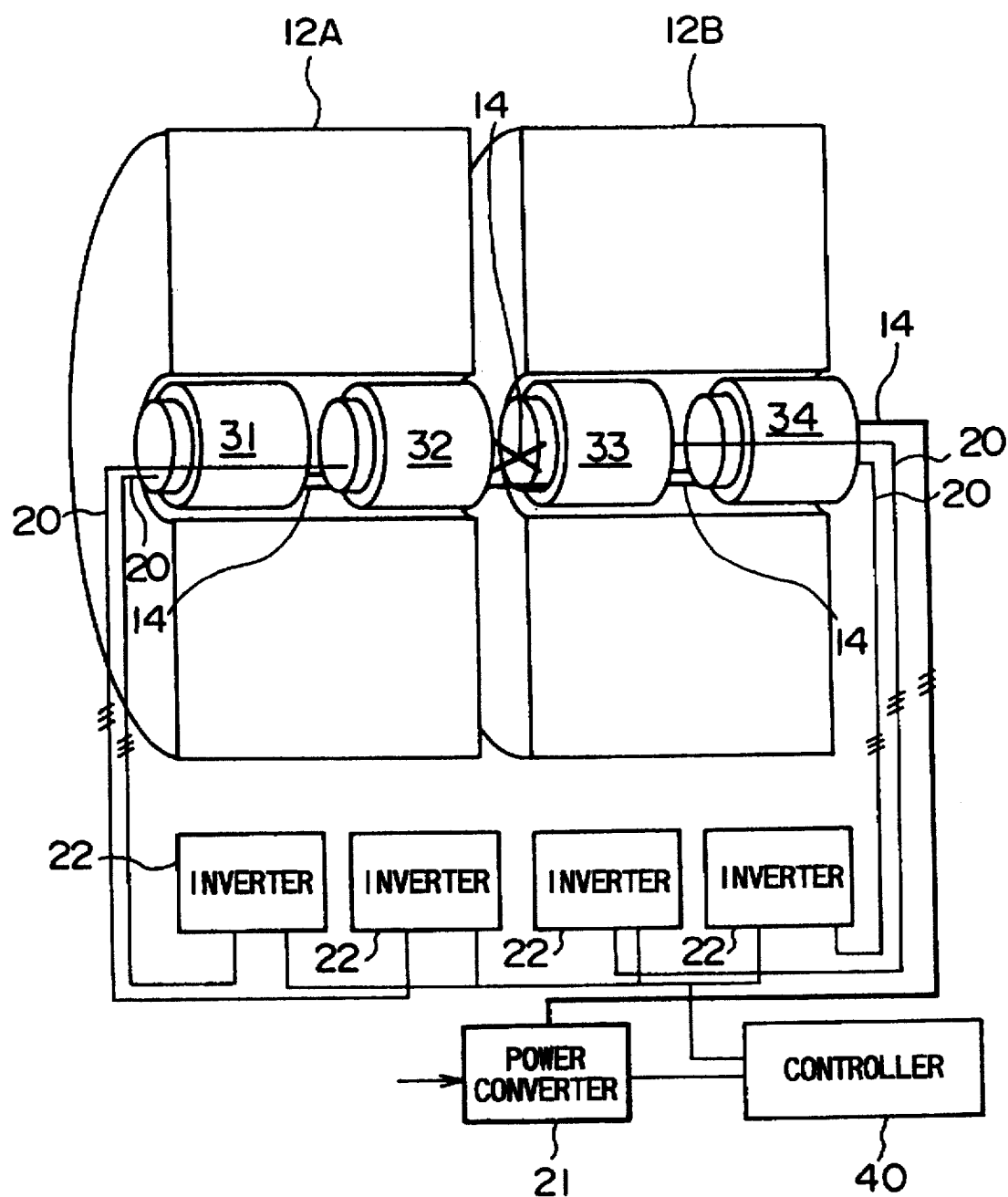
FIG. 8 is a schematic view, partly in block form, of an energy storage flywheel system according to a second embodiment of the present invention.

FIG. 8 shows an energy storage flywheel system according to a second embodiment of the present invention. As shown in FIG. 8, the energy storage flywheel system according to the second embodiment has two axially spaced flywheels 12A, 12B, integral with non-illustrated outer rotors, which are rotatably supported by magnetic bearings for rotation in opposite directions, respectively, for canceling out gyro moment vectors thereof. The flywheels 12A, 12B have respective axes lying horizontally and are disposed around respective sets of actuators 31, 32 and 33, 34 which double as magnetic bearings for supporting the flywheels 12A, 12B. The actuators 31, 32, 33, 34 comprise respective stators, which may be induction-machine or synchronous-machine stators, and respective main windings 14 and respective auxiliary control windings 20 which provide different numbers of poles from those of the main windings 14. When control current flows through the auxiliary control windings 20, the actuators 31, 32, 33, 34 operate as the magnetic bearings to produce radial forces for supporting the flywheels 12A, 12B.

The flywheels 12A, 12B may be axially supported by cone-type bearings, staggered-type bearings, or magnetic thrust bearings, as proposed hereinabove.

The flywheels 12A, 12B with the outer rotors are disposed around the stators. Therefore, the energy storage flywheel system according to the second embodiment is capable of rotating at high speeds and is of a compact structure.

The actuators 31, 32, 33, 34 may be connected in series with each other. The main windings 14 of the actuators 31, 32, 33, 34 may be energized by a single inverter 21. In FIG. 8, the main windings 14 of the actuators 31, 32 are connected in series or parallel to each other, or connected directly to each other through their stator iron. Similarly, the main windings 14 of the actuators 33, 34 are connected in series or parallel to each other, or connected directly to each other through their stator iron. The main windings 14 of the actuators 31, 32 and the main windings 14 of the actuators 33, 34 are connected in different phase sequences to generate magnetic fields in opposite directions for rotating the flywheels 12A, 12B in opposite directions with the single inverter 21.

Figure 9:
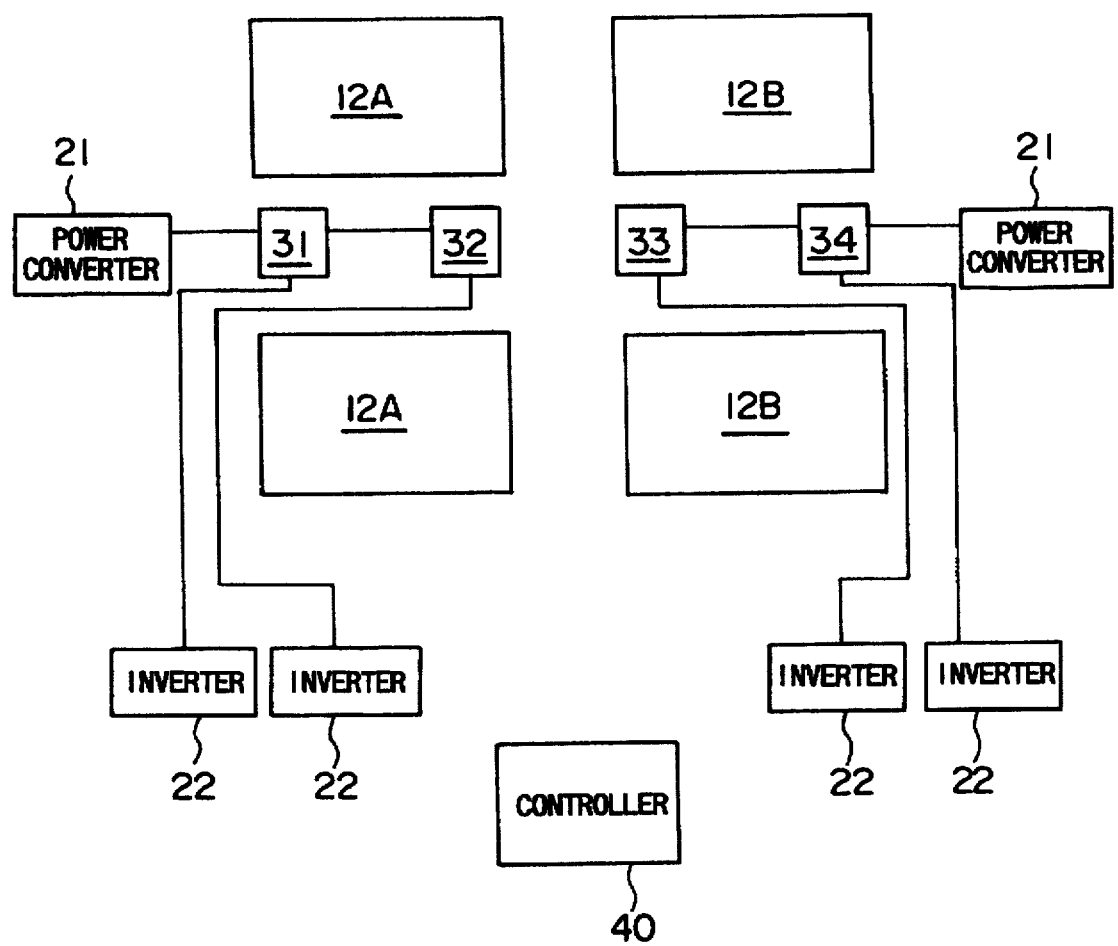
FIG. 9 is a schematic view, partly in block form, of an energy storage flywheel system in which four rotatable assemblies are actuated by two power converters.

Alternatively, the main windings of the actuators 31, 32, 33, 34 may be supplied with currents from two power converters 21 as shown in FIG. 9.

The control windings 20 of the actuators 31, 32, 33, 34 are supplied with control currents from respective power converters 22 for generating radial forces on the flywheels 12A, 12B to control the radial position thereof under the control of a controller 40 which is connected to the power converters 22.

When the flywheels 12A, 12B rotate in opposite directions, they cancel out gyro moment vectors produced thereby. When the gyro moment vectors produced by the flywheels 12A, 12B are canceled, it is possible to reduce forces which are imposed on a moving machine on which the stators of the actuators 31, 32, 33, 34 are mounted.

Figure 10:
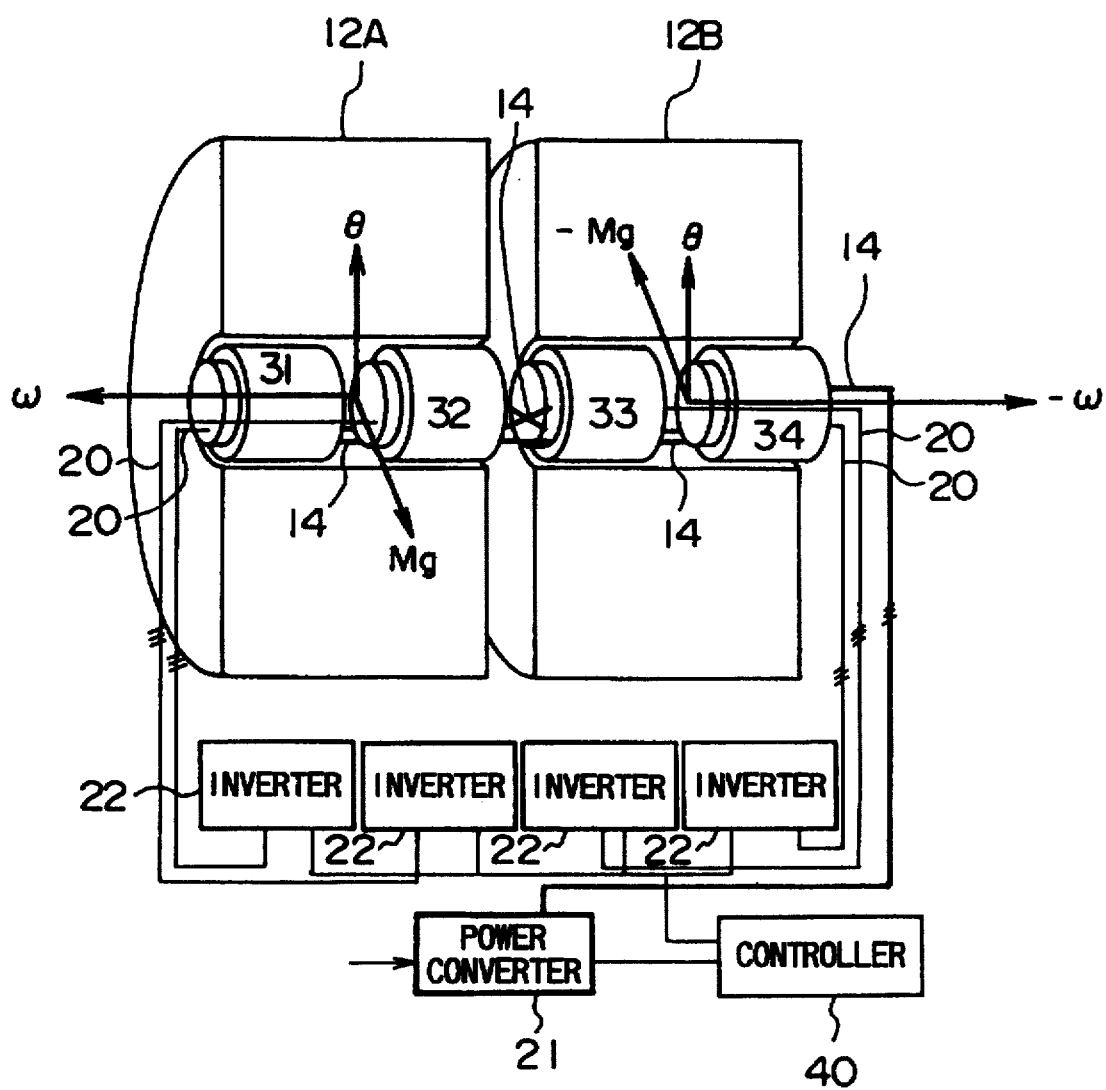
FIG. 10 is a view similar to FIG. 8, illustrative of the manner in which the gyro moment vectors of two flywheels cancel out each other when they rotate in the opposite directions.

FIG. 10 specifically shows the manner in which the gyro moment vectors of the two flywheels 12A, 12B cancel out each other when they rotate in the opposite directions. When an oblique velocity vector $\theta$ acts on the each of the flywheels 12A, 12B perpendicularly to a rotational vector $\omega$ along the axis thereof, a gyro moment vector Mg is generated perpendicularly to the vector $\theta$ and the vector $\omega$.

Since the flywheels 12A, 12B rotate in the opposite directions at almost the same speed, and their oblique velocity vectors $\theta$ are oriented in the same direction, their gyro moment vectors Mg, —Mg are generated in opposite directions, and hence cancel out each other.

The principles of present invention may be incorporated in general-purpose energy storage flywheel systems. Particularly, the energy storage flywheel system according to the first embodiment shown in FIG. 3 is suitable for use in an application such as a spaceship which requires the energy storage flywheel system to store flywheel energy and perform a gyro function. For applications such as an automobile and a railway train on which the stators move at all times, however, the energy storage flywheel system according to the second embodiment shown in FIG. 8 is suitable because no gyro function is desired in such applications.

The energy storage flywheel system according to the present invention may be used to store energy fluctuations on moving machines including railway trains, automobiles, and spaceships, and highly intensive energy fluctuations in energy generating systems including nuclear fusion reactors and nuclear reactors. The energy storage flywheel system can also be used to store energy fluctuations in power supply apparatus including no-break power units and power supplies for spaceships, and also to store less intensive energy fluctuations in machine tools and welding machines.

Although certain preferred embodiments of the present invention have been shown and described in detail, it should be understood that various changes and modifications may be made therein without departing from the scope of the appended claims.

What is claimed is:

1. An energy storage flywheel system comprising:
   stator means;
   a rotor surrounding said stator means and being rotatable with respect thereto;

a flywheel for storing energy integrally attached to said rotor;

said stator means including a pair of axially spaced actuators each having a stator portion containing a first set of windings comprising main windings that provide a number of poles for rotating said rotor and a second set of windings comprising auxiliary windings that provide a number of poles different from the number of poles provided by said first set of windings;

power supply means for supplying voltages or currents to said first set of windings and to said second set of windings; and control means for supplying voltages or currents to said first set of windings to rotate said rotor, and to said second set of windings to produce radial forces acting on said rotor to support said rotor out of contact with said stator.

2. An energy storage flywheel system according to claim 1, wherein said control means comprises means for supplying said control voltages or currents to said second set of windings to produce radial forces acting on said rotor to effect active damping on said flywheel or eliminate disturbances thereon.

3. An energy storage flywheel system according to claim 1, wherein said main windings have coil ends positioned only on outer axial ends of said actuators and extend through inner confronting axial ends of said actuators for commonly rotating said rotor.

4. An energy storage flywheel system according to claim 3, wherein said power supply means comprises a first power converter and a pair of second power converters, said main windings being connected to said first power converter, and said auxiliary control windings being connected respectively to said pair of second power converters.

5. An energy storage flywheel system according to claim 1, wherein the number of poles of the first set of windings is two or four and the second set of windings contains four or two poles, respectively, to complement the number of poles of said first set of windings.

6. An energy storage flywheel system according to claim 1, wherein the number of poles of the first set of windings is eight and the number of poles of the second set of windings is two.

7. An energy storage flywheel system comprising:

a pair of stators;

a pair of axially adjacent rotors, each of which rotors is rotatable with respect to a separate stator, each of said rotors surrounding its associated stator and concentrically mounting a flywheel for storing energy;

each of said stators having main windings that provide a number of poles for rotating the rotor and auxiliary control windings that provide a number of poles different from the number of poles provided by said main windings, said main windings of the stators comprising three-phase windings connected in different phase sequences;

a single power converter for supplying currents to said main windings to rotate said rotors in opposite directions for thereby canceling out gyro moment vectors produced on said flywheels; and four power converters for supplying control currents to said auxiliary control windings to produce radial forces acting on said rotors to support said rotors out of contact with said stators.

8. An energy storage flywheel system comprising:

a pair of stators;

a pair of axially adjacent rotors, each of which rotors is rotatable with respect to a separate stator, each of said rotors concentrically mounting a flywheel for storing energy;

each of said stators having main windings that provide a number of poles for rotating the rotor and auxiliary control windings that provide a number of poles different from the number of poles provided by said main windings;

a pair of power converters for supplying currents to said main windings to rotate each of said rotors in opposite directions for thereby canceling out gyro moment vectors produced on said flywheels; and four power converters for supplying control currents to said auxiliary control windings to produce radial forces acting on said rotors to support said rotors out of contact with said stators.

\* \* \* \* \*